US008828323B2

(12) United States Patent
Weismantel et al.

(10) Patent No.: US 8,828,323 B2
(45) Date of Patent: Sep. 9, 2014

(54) PROCESS FOR PRODUCING WATER-ABSORBING POLYMER PARTICLES

(71) Applicant: BASF SE, Ludwigshafen (DE)

(72) Inventors: Matthias Weismantel, Jossgrund-Oberndorf (DE); Rüdiger Funk, Niedernhausen (DE); Ann Becker, Borsbeek (BE); Leo Van Miert, Kapellen (BE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/667,159

(22) Filed: Nov. 2, 2012

(65) Prior Publication Data

US 2013/0058837 A1 Mar. 7, 2013

Related U.S. Application Data

(62) Division of application No. 12/988,776, filed as application No. PCT/EP2009/054369 on Apr. 14, 2009, now Pat. No. 8,329,844.

(30) Foreign Application Priority Data

Apr. 30, 2008 (EP) .................................... 08155507

(51) Int. Cl.
| | | |
|---|---|---|
| *B01J 19/00* | (2006.01) | |
| *F26B 9/06* | (2006.01) | |
| *F26B 17/14* | (2006.01) | |
| *C08F 220/06* | (2006.01) | |
| *F26B 25/00* | (2006.01) | |
| *B01F 7/08* | (2006.01) | |
| *B01J 8/00* | (2006.01) | |
| *B65G 37/00* | (2006.01) | |
| *C08F 222/10* | (2006.01) | |

(52) U.S. Cl.
CPC ............... *C08F 220/06* (2013.01); *F26B 9/063* (2013.01); *F26B 17/1491* (2013.01); *C08F 222/1006* (2013.01); *F26B 25/002* (2013.01); *B01F 7/081* (2013.01)

USPC .......... 422/131; 422/129; 422/135; 198/570; 198/602; 198/604

(58) Field of Classification Search
CPC ......... A01N 59/00; A01N 37/16; B01J 19/00; B01J 8/00; B01J 2219/00094; C08L 33/02; C08L 2666/02; C08L 53/02; C08L 21/00; C08F 10/00; C08F 2/01; C08F 2/34; C08F 220/06; C08F 6/008; C08F 210/16; C07C 57/04; C07C 51/43; B65G 47/5122; B65G 47/5131; B65G 47/52; B65G 2207/24; B65G 37/00; B65G 37/005; B65G 15/14; C08K 3/36; A61L 15/28; B65H 2220/01; B65H 2220/02; A24C 5/35

USPC ....................... 422/129, 131, 135; 523/318.1; 526/317.1, 72; 198/570, 602, 604

See application file for complete search history.

(56) References Cited

U.S. PATENT DOCUMENTS

| | | | | |
|---|---|---|---|---|
| 3,809,140 A | * | 5/1974 | Erdmenger et al. | ........... 159/2.2 |
| 4,247,437 A | * | 1/1981 | Ohshima et al. | ............... 523/318 |

(Continued)

FOREIGN PATENT DOCUMENTS

| | | |
|---|---|---|
| DE | 102005001802 A1 | 4/2006 |
| EP | 1 357 067 A1 | 10/2003 |

*Primary Examiner* — Natasha Young
(74) *Attorney, Agent, or Firm* — Marshall, Gerstein & Borun LLP

(57) ABSTRACT

A process for producing water-absorbing polymer particles, wherein a polymer gel is removed from a polymerization reactor, stored intermediately as a particulate polymer gel in a delay vessel, removed by means of a first conveying device at the lower end of the delay vessel and dried, the intermediately stored particulate polymer gel being conveyed within the delay vessel by means of at least one second conveying device above the first conveying device in the direction of the first conveying device.

11 Claims, 2 Drawing Sheets

(56) References Cited

U.S. PATENT DOCUMENTS

Figure 2A:
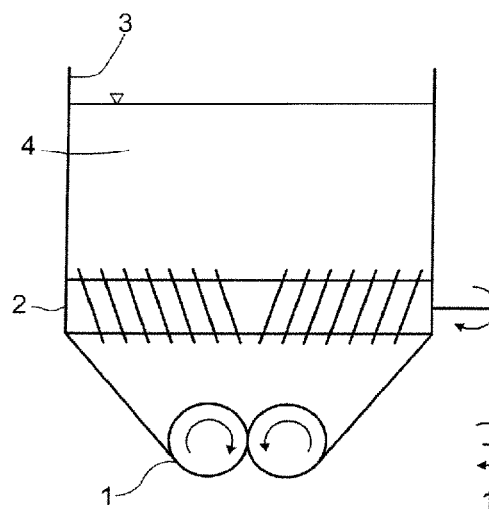

| | | | |
|---|---|---|---|
| 4,372,549 A * | 2/1983 | Stiernspetz | 271/23 |
| 5,229,487 A * | 7/1993 | Tsubakimoto et al. | 528/484 |
| 5,335,766 A * | 8/1994 | Rizzoli et al. | 198/347.1 |
| 5,622,323 A | 4/1997 | Krueger et al. | |
| 6,710,141 B1 * | 3/2004 | Heide et al. | 526/88 |
| 6,817,557 B2 | 11/2004 | Kakita et al. | |
| 2003/0020199 A1 | 1/2003 | Kajikawa et al. | |
| 2005/0051925 A1 | 3/2005 | Gartner et al. | |
| 2008/0188950 A1 | 8/2008 | Fleury et al. | |

* cited by examiner

FIG.1A
FIG.1B
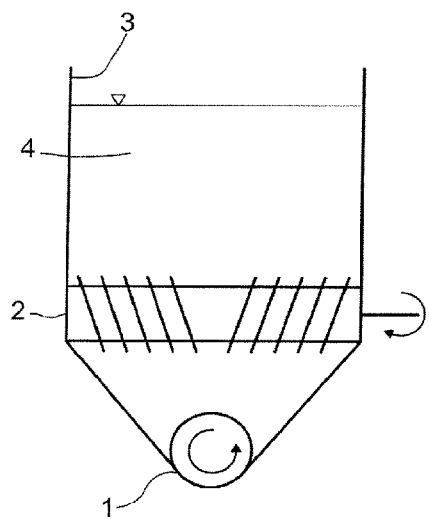
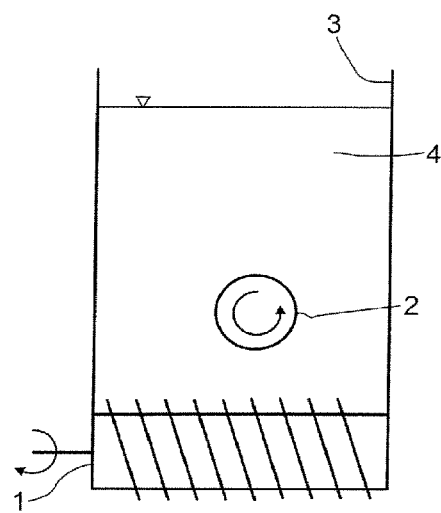

PROCESS FOR PRODUCING WATER-ABSORBING POLYMER PARTICLES

CROSS-REFERENCE TO RELATED APPLICATIONS

This is a divisional of U.S. patent application Ser. No. 12/988,776, filed Oct. 20, 2010, now U.S. Pat. No. 8,329,844, which is the U.S. national phase application of International Application No. PCT/EP2009/054369, filed Apr. 14, 2009, which claims the benefit of European patent application No. 08155507.0, filed Apr. 30, 2008.

The present invention relates to a process for producing water-absorbing polymer particles, wherein a polymer gel is removed from a polymerization reactor and stored intermediately in a delay vessel in the form of particulate polymer gel.

The production of water-absorbing polymer particles is described in the monograph "Modern Superabsorbent Polymer Technology", F. L. Buchholz and A. T. Graham, Wiley-VCH, 1998, pages 71 to 103.

The polymer gel obtained by solution polymerization can be stored intermediately in an insulated vessel to increase the monomer conversion.

Water-absorbing polymers are used to produce diapers, tampons, sanitary napkins and other hygiene articles, but also as water-retaining agents in market gardening.

It was an object of the present invention to provide an improved process for producing water-absorbing polymer particles.

The object is achieved by a process for producing water-absorbing polymer particles by polymerizing a monomer solution or suspension comprising a) at least one ethylenically unsaturated monomer which bears acid groups and may be at least partly neutralized,
b) at least one crosslinker,
c) at least one initiator,
d) optionally one or more ethylenically unsaturated monomers copolymerizable with the monomers specified under a) and
e) optionally one or more water-soluble polymers in at least one polymerization reactor, the resulting polymer gel being removed from the polymerization reactor, optionally comminuted, stored intermediately in at least one delay vessel in the form of particulate polymer gel, removed by means of at least one first conveying device at the lower end of the delay vessel and dried, wherein the intermediately stored particulate polymer gel is conveyed within the delay vessel by means of at least one second conveying device above the first conveying device in the direction of the first conveying device.

When the polymer gel is not already obtained in the form of particulate polymer gel in the polymerization reactor, the polymer gel has to be comminuted to a particulate polymer gel. Polymerization reactors in which a particulate polymer gel is obtained directly are, for example, kneading reactors. Polymerization reactors in which a particulate polymer gel is not obtained are, for example, belt reactors.

The particle size of the particulate polymer gel is preferably from 0.1 to 100 mm, more preferably from 0.5 to 10 mm, most preferably from 1 to 3 mm.

The polymer gel is removed from the delay vessel by means of at least one first conveying device, preferably by means of at least one screw conveyor, more preferably by means of at least one screw conveyor with two contrarotatory conveying screws, and preferably transferred by means of a swivel belt into the drying device, for example a belt dryer.

When the first conveying device used is a screw conveyor, the speed of the conveying screw is preferably from 1 to 50 revolutions/minute, more preferably from 5 to 30 revolutions/minute, most preferably from 10 to 20 revolutions/minute. The external diameter of the conveying screw is preferably from 0.05 to 0.5 m, more preferably from 0.1 to 0.4 m, most preferably from 0.2 to 0.3 m.

The polymer gel is conveyed within the delay vessel in the direction of the first conveying device by means of at least one second conveying device, preferably by means of at least one screw conveyor, more preferably by means of at least one screw conveyor with two contrarotatory conveying screws, most preferably by means of two screw conveyors with two contrarotatory conveying screws each.

When the second conveying device used is a screw conveyor, the speed of the conveying screw is preferably from 0.05 to 5 revolutions/minute, more preferably from 0.1 to 2 revolutions/minute, most preferably from 0.2 to 1 revolution/minute. The external diameter of the conveying screw is preferably from 0.1 to 1.5 m, more preferably from 0.25 to 1 m, most preferably from 0.5 to 0.75 m.

The conveying performance of the second conveying device should be lower than the conveying performance of the first conveying device in order to prevent undesired compaction of the polymer gel.

In a preferred embodiment of the present invention, screw conveyors with a combination of right-hand and left-hand threads are used as the second conveying device. The combination of right-hand and left-hand threads on one shaft enables the transport of the particulate polymer gel from the outer regions to the center.

The conveying direction, i.e. the axes of rotation of the screw conveyors of the first conveying device and of the second conveying device, are typically arranged offset horizontally. The angle enclosed is preferably from 45 to 90°, more preferably from 80 to 90°, most preferably from 85 to 90°.

The figures show preferred embodiments of the invention, the reference numerals having the following meanings:

1 first conveying device
2 second conveying device
3 delay vessel
4 particulate polymer gel FIGS. 1a and 1b show two vertical sections, rotated by 90°, through a delay vessel with a screw conveyor as the first conveying device and a screw conveyor as the second conveying device. The screw conveyor of the second conveying device has a right-hand and left-hand thread and conveys from the vessel wall to the center of the vessel.

Figure 2B:
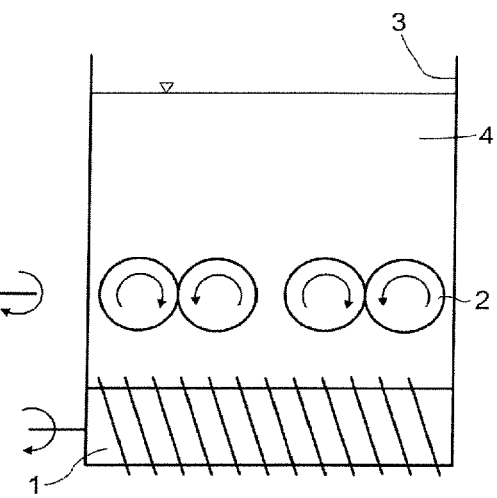

FIGS. 2a and 2b show two vertical sections, rotated by 90°, through a delay vessel with a screw conveyor with two contrarotatory conveying screws as the first conveying device, and two screw conveyors with two contrarotatory conveying screws each as the second conveying device. The screw conveyors of the second conveying device have a right-hand and left-hand thread, and convey from the vessel wall to the center of the vessel.

The two screw conveyors according to FIGS. 2a and 2b are advantageously arranged such that the conveying screws of the two adjacent conveying screws just fail to intermesh. In contrast, the two contrarotatory conveying screws of the screw conveyor in each case typically intermesh.

Moreover, the size of the conveying screws should be selected such that the conveying screws of the second conveying device very substantially occupy the horizontal cross section of the delay vessel, i.e. there are no areas in which the particulate polymer gel is not conveyed.

In the process according to the invention, it is possible to use delay vessels with a greater cross section than has been customary to date. In spite of the increased cross section, there is no tendency to form bridges in the vessel. As a result, it is possible to implement delay vessels with a lower bed height. Owing to the lower bed height, the particulate polymer gels are less highly compacted in the delay vessel and can be dried more easily.

The vertical distance between the first conveying device and the second conveying device is preferably less than 0.5 m, more preferably less than 0.2 m, most preferably less than 0.1 m.

The residence time of the particulate polymer gel in the delay vessel is preferably from 1 to 60 minutes, more preferably from 2 to 30 minutes, most preferably from 5 to 15 minutes.

The temperature of the particulate polymer gel in the delay vessel is preferably from 60 to 100° C., more preferably from 70 to 95° C., most preferably from 80 to 90° C. Typically, the delay vessel is thermally insulated.

The bed height of the particulate polymer gel in the delay vessel is preferably from 0.5 to 3 m, more preferably from 0.8 to 2.5 m, most preferably from 1 to 2 m.

The gas atmosphere in the delay vessel has a partial oxygen pressure of preferably less than 50 mbar, more preferably of less than 10 mbar, most preferably of less than 2 mbar. Oxygen scavenges free radicals which are present in the particulate polymer gel or form as a result of residual initiator decomposition. However, these free radicals are needed to convert the residual monomers.

The particulate polymer gel in the delay vessel has a water content of preferably from 30 to 70% by weight, more preferably from 35 to 65% by weight, most preferably from 40 to 60% by weight. Lower and higher water contents lead to a reduced conversion of residual monomers in the delay vessel.

The water-absorbing polymer particles are produced by polymerizing a monomer solution or suspension and are typically water-insoluble.

The monomers a) are preferably water-soluble, i.e. the solubility in water at 23° C. is typically at least 1 g/100 g of water, preferably at least 5 g/100 g of water, more preferably at least 25 g/100 g of water, most preferably at least 35 g/100 g of water.

Suitable monomers a) are, for example, ethylenically unsaturated carboxylic acids, such as acrylic acid, methacrylic acid and itaconic acid. Particularly preferred monomers are acrylic acid and methacrylic acid. Very particular preference is given to acrylic acid.

Further suitable monomers a) are, for example, ethylenically unsaturated sulfonic acids, such as styrenesulfonic acid and 2-acrylamido-2-methylpropanesulfonic acid (AMPS).

Impurities can have a considerable influence on the polymerization. The raw materials used should therefore have a maximum purity. It is therefore often advantageous to specially purify the monomers a). Suitable purification processes are described, for example, in WO 2002/055469 A1, WO 2003/078378 A1 and WO 2004/035514 A1. A suitable monomer a) is, for example, acrylic acid purified according to WO 2004/035514 A1 comprising 99.8460% by weight of acrylic acid, 0.0950% by weight of acetic acid, 0.0332% by weight of water, 0.0203% by weight of propionic acid, 0.0001% by weight of furfurals, 0.0001% by weight of maleic anhydride, 0.0003% by weight of diacrylic acid and 0.0050% by weight of hydroquinone monomethyl ether.

The proportion of acrylic acid and/or salts thereof in the total amount of monomers a) is preferably at least 50 mol %, more preferably at least 90 mol %, most preferably at least 95 mol %.

The monomers a) typically comprise polymerization inhibitors, preferably hydroquinone monoethers, as storage stabilizers.

The monomer solution comprises preferably up to 250 ppm by weight, preferably at most 130 ppm by weight, more preferably at most 70 ppm by weight, preferably at least 10 ppm by weight, more preferably at least 30 ppm by weight, especially around 50 ppm by weight, of hydroquinone monoether, based in each case on the unneutralized monomer a). For example, the monomer solution can be prepared by using an ethylenically unsaturated monomer bearing acid groups with an appropriate content of hydroquinone monoether.

Preferred hydroquinone monoethers are hydroquinone monomethyl ether (MEHQ) and/or alpha-tocopherol (vitamin E).

Suitable crosslinkers b) are compounds having at least two groups suitable for crosslinking. Such groups are, for example, ethylenically unsaturated groups which can be polymerized free-radically into the polymer chain, and functional groups which can form covalent bonds with the acid groups of the monomer a). In addition, polyvalent metal salts which can form coordinate bonds with at least two acid groups of the monomer a) are also suitable as crosslinkers b).

Crosslinkers b) are preferably compounds having at least two polymerizable groups which can be polymerized free-radically into the polymer network. Suitable crosslinkers b) are, for example, ethylene glycol dimethacrylate, diethylene glycol diacrylate, polyethylene glycol diacrylate, allyl methacrylate, trimethylolpropane triacrylate, triallylamine, tetraallylammonium chloride, tetraallyloxyethane, as described in EP 0 530 438 A1, di- and triacrylates, as described in EP 0 547 847 A1, EP 0 559 476 A1, EP 0 632 068 A1, WO 93/21237 A1, WO 2003/104299 A1, WO 2003/104300 A1, WO 2003/104301 A1 and DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/032962 A2.

Preferred crosslinkers b) are pentaerythrityl triallyl ether, tetraalloxyethane, methylenebismethacrylamide, 15-tuply ethoxylated trimethylolpropane triacrylate, polyethylene glycol diacrylate, trimethylolpropane triacrylate and triallylamine.

Very particularly preferred crosslinkers b) are the polyethoxylated and/or -propoxylated glycerols which have been esterified with acrylic acid or methacrylic acid to give di- or triacrylates, as described, for example, in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol, especially the triacrylate of 3-tuply ethoxylated glycerol.

The amount of crosslinker b) is preferably from 0.05 to 1.5% by weight, more preferably from 0.1 to 1% by weight, most preferably from 0.3 to 0.6% by weight, based in each case on monomer a). With rising crosslinker content, the centrifuge retention capacity (CRC) falls and the absorption under a pressure of 21.0 g/cm$^2$ (AUL0.3 psi) passes through a maximum.

The initiators c) may be all compounds which generate in free radicals under the polymerization conditions, for example thermal initiators, redox initiators, photoinitiators. Suitable redox initiators are sodium peroxodisulfate/ascorbic acid, hydrogen peroxide/ascorbic acid, sodium peroxodisulfate/sodium bisulfite and hydrogen peroxide/sodium bisulfite. Preference is given to using mixtures of thermal initiators and redox initiators, such as sodium peroxodisulfate/hydrogen peroxide/ascorbic acid. The reducing component used is, however, preferably a mixture of the sodium salt of 2-hydroxy-2-sulfinatoacetic acid, the disodium salt of 2-hydroxy-2-sulfonatoacetic acid and sodium bisulfite. Such mixtures are obtainable as Brüggolite® FF6 and Brüggolite® FF7 (Brüggemann Chemicals; Heilbronn; Germany).

Ethylenically unsaturated monomers d) copolymerizable with the ethylenically unsaturated monomers a) bearing acid groups are, for example, acrylamide, methacrylamide, hydroxyethyl acrylate, hydroxyethyl methacrylate, dimethylaminoethyl methacrylate, dimethylaminoethyl acrylate, dimethylaminopropyl acrylate, diethylaminopropyl acrylate, dimethylaminoethyl methacrylate, diethylaminoethyl methacrylate.

The water-soluble polymers e) used may be polyvinyl alcohol, polyvinylpyrrolidone, starch, starch derivatives, modified cellulose, such as methylcellulose or hydroxyethylcellulose, gelatin, polyglycols or polyacrylic acids, preferably starch, starch derivatives and modified cellulose.

Typically, an aqueous monomer solution is used. The water content of the monomer solution is preferably from 40 to 75% by weight, more preferably from 45 to 70% by weight, most preferably from 50 to 65% by weight. It is also possible to use monomer suspensions, i.e. oversaturated monomer solutions. With rising water content, the energy requirement in the subsequent drying rises, and, with falling water content, the heat of polymerization can only be removed inadequately.

For optimal action, the preferred polymerization inhibitors require dissolved oxygen. The monomer solution can therefore be freed of dissolved oxygen before the polymerization by inertization, i.e. flowing an inert gas through, preferably nitrogen or carbon dioxide. The oxygen content of the monomer solution is preferably lowered before the polymerization to less than 1 ppm by weight, more preferably to less than 0.5 ppm by weight, most preferably to less than 0.1 ppm by weight.

Suitable reactors are, for example, kneading reactors or belt reactors. In the kneader, the polymer gel formed in the polymerization of an aqueous monomer solution or suspension is comminuted continuously by, for example, contrarotatory stirrer shafts, as described in WO 2001/038402 A1. Polymerization on a belt is described, for example, in DE 38 25 366 A1 and U.S. Pat. No. 6,241,928. Polymerization in a belt reactor forms a polymer gel, which has to be comminuted in a further process step, for example in an extruder or kneader.

The acid groups of the resulting polymer gels have typically been partially neutralized. Neutralization is preferably carried out at the monomer stage. This is typically done by mixing in the neutralizing agent as an aqueous solution or preferably also as a solid. The degree of neutralization is preferably from 25 to 95 mol %, more preferably from 30 to 80 mol %, most preferably from 40 to 75 mol %, for which the customary neutralizing agents can be used, preferably alkali metal hydroxides, alkali metal oxides, alkali metal carbonates or alkali metal hydrogencarbonates and also mixtures thereof. Instead of alkali metal salts, it is also possible to use ammonium salts. Particularly preferred alkali metals are sodium and potassium, but very particular preference is given to sodium hydroxide, sodium carbonate or sodium hydrogencarbonate and also mixtures thereof.

However, it is also possible to carry out neutralization after the polymerization, at the stage of the polymer gel formed in the polymerization. It is also possible to neutralize up to 40 mol %, preferably from 10 to 30 mol % and more preferably from 15 to 25 mol % of the acid groups before the polymerization by adding a portion of the neutralizing agent actually to the monomer solution and setting the desired final degree of neutralization only after the polymerization, at the polymer gel stage. When the polymer gel is neutralized at least partly after the polymerization, the polymer gel is preferably comminuted mechanically, for example by means of an extruder, in which case the neutralizing agent can be sprayed, sprinkled or poured on and then carefully mixed in. To this end, the gel mass obtained can be repeatedly extruded for homogenization.

The polymer gel is then preferably dried with a belt dryer until the residual moisture content is preferably from 0.5 to 15% by weight, more preferably from 1 to 10% by weight, most preferably from 2 to 8% by weight, the residual moisture content being determined by the EDANA (European Disposables and Nonwovens Association) recommended test method No. WSP 230.2-05 "Moisture Content". In the case of too high a residual moisture content, the dried polymer gel has too low a glass transition temperature $T_g$ and can be processed further only with difficulty. In the case of too low a residual moisture content, the dried polymer gel is too brittle and, in the subsequent comminution steps, undesirably large amounts of polymer particles with an excessively low particle size are obtained ("fines"). The solids content of the gel before the drying is preferably from 25 to 90% by weight, more preferably from 35 to 70% by weight, most preferably from 40 to 60% by weight. Optionally, it is, however, also possible to use a fluidized bed dryer or a heated plowshare mixer for the drying operation.

The polymer gel which has additionally been loosened in the gel bunker by the process according to the invention can be dried better in comparison with polymer gel which has not additionally been pretreated. The process according to the invention is advantageously performed continuously.

Thereafter, the dried polymer gel is ground and classified, and the apparatus used for grinding may typically be single- or multistage roll mills, preferably two- or three-stage roll mills, pin mills, hammer mills or vibratory mills.

The mean particle size of the polymer particles removed as the product fraction is preferably at least 200 µm, more preferably from 250 to 600 µm, very particularly from 300 to 500 µm. The mean particle size of the product fraction may be determined by means of the EDANA (European Disposables and Nonwovens Association) recommended test method No. WSP 220.2-05 "Particle Size Distribution", where the proportions by mass of the screen fractions are plotted in cumulated form and the mean particle size is determined graphically. The mean particle size here is the value of the mesh size which gives rise to a cumulative 50% by weight.

The proportion of particles with a mean particle size of at least 150 µm is preferably at least 90% by weight, more preferably at least 95% by weight, most preferably at least 98% by weight.

Polymer particles with too small a particle size lower the permeability (SFC). The proportion of excessively small polymer particles ("fines") should therefore preferably be small.

The proportion of particles with a particle size of at most 850 µm is preferably at least 90% by weight, more preferably at least 95% by weight, most preferably at least 98% by weight.

Polymer particles with too great a particle size lower the swell rate. The proportion of excessively large polymer particles should therefore likewise be small.

To further improve the properties, the polymer particles may be postcrosslinked. Suitable postcrosslinkers are compounds which comprise groups which can form covalent bonds with at least two carboxylate groups of the polymer particle. Suitable compounds are, for example, polyfunctional amines, polyfunctional amido amines, polyfunctional epoxides, as described in EP 0 083 022 A2, EP 0 543 303 A1 and EP 0 937 736 A2, di- or polyfunctional alcohols, as described in DE 33 14 019 A1, DE 35 23 617 A1 and EP D450 922 A2, or β-hydroxyalkylamides, as described in DE 102 04 938 A1 and U.S. Pat. No. 6,239,230.

Additionally described as suitable postcrosslinkers are cyclic carbonates in DE 40 20 780 C1,2-oxazolidone and its derivatives, such as 2-hydroxyethyl-2-oxazolidone, in DE 198 07 502 A1, bis- and poly-2-oxazolidinones in DE 198 07 992 C1,2-oxotetrahydro-1,3-oxazine and its derivatives in DE 198 54 573 A1, N-acyl-2-oxazolidones in DE 198 54 574 A1, cyclic ureas in DE 102 04 937 A1, bicyclic amide acetals in DE 103 34 584 A1, oxetanes and cyclic ureas in EP 1 199 327 A2 and morpholine-2,3-dione and its derivatives in WO 2003/031482 A1.

Preferred postcrosslinkers are ethylene carbonate, ethylene glycol diglycidyl ether, reaction products of polyamides with epichlorohydrin and mixtures of propylene glycol and 1,4-butanediol.

Very particularly preferred postcrosslinkers are 2-hydroxyethyloxazolidin-2-one, oxazolidin-2-one and 1,3-propanediol.

In addition, it is also possible to use postcrosslinkers which comprise additional polymerizable ethylenically unsaturated groups, as described in DE 37 13 601 A1.

The amount of postcrosslinker is preferably from 0.001 to 2% by weight, more preferably from 0.02 to 1% by weight, most preferably from 0.05 to 0.2% by weight, based in each case on the polymer particles.

In a preferred embodiment of the present invention, polyvalent cations are applied to the particle surface in addition to the postcrosslinkers before, during or after the postcrosslinking.

The polyvalent cations usable in the process according to the invention are, for example, divalent cations such as the cations of zinc, magnesium, calcium, iron and strontium, trivalent cations such as the cations of aluminum, iron, chromium, rare earths and manganese, tetravalent cations such as the cations of titanium and zirconium. Possible counterions are chloride, bromide, sulfate, hydrogensulfate, carbonate, hydrogencarbonate, nitrate, phosphate, hydrogenphosphate, dihydrogenphosphate and carboxylate, such as acetate and lactate. Aluminum sulfate and aluminum lactate are preferred. Apart from metal salts, it is also possible to use polyamines as polyvalent cations.

The amount of polyvalent cation used is, for example, from 0.001 to 1.5% by weight, preferably from 0.005 to 1% by weight, more preferably from 0.02 to 0.8% by weight, based in each case on the polymer particles.

The postcrosslinking is typically performed in such a way that a solution of the postcrosslinker is sprayed onto the dried polymer particles. After the spraying, the polymer particles coated with postcrosslinker are dried thermally, and the postcrosslinking reaction can take place either before or during the drying.

The spraying of a solution of the postcrosslinker is preferably performed in mixers with moving mixing tools, such as screw mixers, disk mixers, plowshare mixers and paddle mixers. Particular preference is given to horizontal mixers such as plowshare mixers and paddle mixers, very particular preference to vertical mixers. Suitable mixers are, for example, Lödige mixers, Bepex mixers, Nauta mixers, Processall mixers and Schugi mixers. However, it is also possible to spray on the postcrosslinker solution in a fluidized bed.

The postcrosslinkers are typically used in the form of an aqueous solution. The content of nonaqueous solvent or total amount of solvent can be used to adjust the penetration depth of the postcrosslinker into the polymer particles.

When exclusively water is used as the solvent, a surfactant is advantageously added. This improves the wetting behavior and reduces the tendency to form lumps. However, preference is given to using solvent mixtures, for example isopropanol/water, 1,3-propanediol/water and propylene glycol/water, where the mixing ratio is preferably from 20:80 to 40:60.

The thermal drying is preferably carried out in contact dryers, more preferably paddle dryers, most preferably disk dryers. Suitable dryers are, for example, Bepex dryers and Nara dryers. Moreover, it is also possible to use fluidized bed dryers.

The drying can be effected in the mixer itself, by heating the jacket or blowing in warm air. Equally suitable is a downstream dryer, for example a shelf dryer, a rotary tube oven or a heatable screw. It is particularly advantageous to mix and dry in a fluidized bed dryer.

Preferred drying temperatures are in the range from 100 to 250° C., preferably from 120 to 220° C., more preferably from 130 to 210° C., most preferably from 150 to 200° C. The preferred residence time at this temperature in the reaction mixer or dryer is preferably at least 10 minutes, more preferably at least 20 minutes, most preferably at least 30 minutes, and typically at most 60 minutes.

Subsequently, the postcrosslinked polymer can be classified again.

To further improve the properties, the postcrosslinked polymer particles can be coated or subsequently moistened. Suitable coatings for improving the swell rate and the permeability (SFC) are, for example, inorganic inert substances, such as water-insoluble metal salts, organic polymers, cationic polymers and di- or polyvalent metal cations. Suitable coatings for dust binding are, for example, polyols. Suitable coatings for counteracting the undesired caking tendency of the polymer particles are, for example, fumed silica, such as Aerosil® 200, and surfactants, such as Span® 20.

The water-absorbing polymer particles produced by the process according to the invention have a moisture content of preferably from 0 to 15% by weight, more preferably from 0.2 to 10% by weight, most preferably from 0.5 to 8% by weight, the water content being determined by the EDANA (European Disposables and Nonwovens Association) recommended test method No. WSP 230.2-05 "Moisture Content".

The water-absorbing polymer particles produced by the process according to the invention have a centrifuge retention capacity (CRC) of typically at least 15 g/g, preferably at least 20 g/g, preferentially at least 22 g/g, more preferably at least 24 g/g, most preferably at least 26 g/g. The centrifuge retention capacity (CRC) of the water-absorbing polymer particles is typically less than 60 g/g. The centrifuge retention capacity (CRC) is determined by the EDANA (European Disposables and Nonwovens Association) recommended test method No. WSP 241.2-05 "Centrifuge Retention Capacity".

The water-absorbing polymer particles produced by the process according to the invention have an absorption under a pressure of 49.0 g/cm$^2$ (0.7 psi) of typically at least 15 g/g, preferably at least 20 g/g, preferentially at least 22 g/g, more preferably at least 24 g/g, most preferably at least 26 g/g. The absorption under a pressure of 49.0 g/cm$^2$ (AUL0.7 psi) of the water-absorbing polymer particles is typically less than 35 g/g. The absorption under a pressure of 49.0 g/cm$^2$ (AUL0.7 psi) is determined analogously to the EDANA (European Disposables and Nonwovens Association) recommended test method No. WSP 242.2-05 "Absorption under pressure", except that a pressure of 49.0 g/cm$^2$ (0.7 psi) is established instead of a pressure of 21.0 g/cm$^2$ (0.3 psi).

The present invention further provides a vessel for performing the process according to the invention.

The present invention further provides an apparatus for producing water-absorbing polymer particles, comprising at least one polymerization reactor, at least one inventive vessel and at least one drying apparatus.

Methods:

The measurements should, unless stated otherwise, be performed at an ambient temperature of 23±2° C. and a relative atmospheric humidity of 50±10%. The water-absorbing polymers are mixed thoroughly before the measurement.

Residual Monomers

The content of residual monomers in the water-absorbing polymer particles is determined by the EDANA (European Disposables and Nonwovens Association) recommended test method No. 410.2-02 "Residual Monomers".

The content of residual monomers in the polymer gels is determined analogously. In a departure from the above test method, for this purpose, 1 g of polymer gel is stirred in 200 ml of 10% by weight sodium chloride solution by means of a magnetic stirrer at 300 revolutions/minute for a total of 6 hours. The stirrer bar used is a disk-shaped magnetic stirrer bar with a diameter of 30 mm and a height of 12 mm.

The EDANA test methods are, for example, obtainable from the European Disposables and Nonwovens Association, Avenue Eugène Plasky 157, B-1030 Brussels, Belgium.

EXAMPLE 1

Comparative

By continuously mixing water, 50% by weight sodium hydroxide solution and acrylic acid, a 38.8% by weight acrylic acid/sodium acrylate solution was prepared such that the degree of neutralization was 71.3 mol %. The solids content of the monomer solution was 38.8% by weight. After mixing the components, the monomer solution was cooled continuously by means of a heat exchanger.

The polyethylenically unsaturated crosslinker used is polyethylene glycol-400 diacrylate (diacrylate of a polyethylene glycol having a mean molar mass of 400 g/mol). The amount used was 2 kg per t of monomer solution.

To initiate the free-radical polymerization, the following components were used: hydrogen peroxide (1.03 kg (0.25% by weight) per t of monomer solution), sodium peroxodisulfate (3.10 kg (15% by weight) per t of monomer solution) and ascorbic acid (1.05 kg (1% by weight) per t of monomer solution).

The throughput of the monomer solution was 17 t/h.

The individual components are metered continuously into a List Contikneter continuous kneader of capacity 6.3 m$^3$ (from List, Arisdorf, Switzerland) in the following amounts:

17 t/h of monomer solution
34 kg/h of polyethylene glycol-400 diacrylate
70.2 kg/h of hydrogen peroxide solution/sodium peroxodisulfate solution
17.9 kg/h of ascorbic acid solution Between the addition points for crosslinker and initiators, the monomer solution was innertized with nitrogen.

At the end of the reactor, 1000 kg/h of removed undersize with a particle size less than 150 µm were additionally metered in.

At the feed, the reaction solution had a temperature of 23.5° C. The reactor was operated with a shaft speed of 38 rpm. The residence time of the reaction mixture in the reactor was 15 minutes.

After polymerization and gel comminution, the aqueous polymer gel was applied via a delay vessel to a forced air belt dryer.

The delay vessel had a square base with an edge length of 2.2 m and a height of 2.3 m.

The delay vessel had a screw conveyor with two contrarotatory conveying screws as the first conveying device and two screw conveyors with two contrarotatory conveying screws each as the second conveying device. The screw conveyors of the second conveying device had a right-hand and left-hand thread and conveyed from the vessel wall to the center of the vessel (FIGS. 2a and 2b).

The conveying screws of the first conveying device were operated at 14 revolutions/minute, and the conveying screws of the second conveying device were operated at 0.5 revolutions/minute.

The conveying screws of the first conveying device had an external diameter of 250 mm. The distance between the shafts of the contrarotatory conveying screws was 180 mm.

The conveying screws of the second conveying device had an external diameter of 630 mm. The distance between the shafts of the contrarotatory conveying screws was 465 mm.

The delay vessel was operated such that no fill level could build up. The second conveying device was switched off.

The dried hydrogel had a residual moisture content of approx. 3% by weight and was coarsely comminuted.

The content of residual monomers (remos) was determined before and after the drying, as was the proportion of polymer particles having a particle size of greater than 10 mm after the coarse comminution (agglomerates). The results are summarized in the tables.

EXAMPLE 2

Comparative

The procedure was as in example 1. The fill level in the delay vessel was between 60 and 80%. The second conveying device remained switched off.

EXAMPLE 3

The procedure was as in example 1. The fill level in the delay vessel was between 60 and 80%. The second conveying device was switched on.

TABLE

| Ex. | Fill level | Second conveying device | Remos before drying | Agglomerates | Remos after drying |
|---|---|---|---|---|---|
| 1* | None | Switched off | 0.8% by wt. | <0.5 t/h | 600 ppm |
| 2* | 60-80% | Switched off | 0.3% by wt. | 1.2 t/h | 320 ppm |
| 3 | 60-80% | Switched on | 0.3% by wt. | <0.5 t/h | 310 ppm |

*Comparative example

The invention claimed is:

1. A vessel for storing a particulate polymer gel comprising at least one rotating first conveying device within and at a lower end of the vessel and at least one rotating second conveying device within the vessel and above the first conveying device, wherein the at least one rotating second conveying device conveys in a direction toward the at least one rotating first conveying device, and an axis of rotation of the at least one rotating first conveying device is offset horizontally from an axis of rotation of the at least one rotating second conveyor device.

2. The vessel according to claim 1, wherein a vertical distance between the first conveying device and the second conveying device is less than 0.5 m.

3. The vessel according to claim 1, wherein the first conveying device is a screw conveyor.

4. The vessel according to claim 1, wherein the second conveying device is a screw conveyor.

5. The vessel according to claim 1, wherein the second conveying device is a screw conveyor with a combination of right-hand and left-hand thread.

6. The vessel according to claim 1, wherein the first conveying device and/or the second conveying device is at least one screw conveyor with two contrarotatory conveying screws.

7. An apparatus for producing water-absorbing polymer particles comprising at least one polymerization reactor, at least one vessel according to claim 1, and at least one drying apparatus.

8. The vessel according to claim 1 wherein a conveying performance of the second conveying device is lower than a conveying performance of the first conveying device.

9. The vessel according to claim 1 wherein the axis of rotation of the at least one rotating first conveying device is offset horizontally from the axis of rotation of the at least one rotating second conveying device by from 45° to 90°.

10. The vessel according to claim 1 wherein the axis of rotation of the at least one rotating first conveying device is offset horizontally from the axis of rotation of the at least one rotating second conveying device by from 80° to 90°.

11. The vessel according to claim 1 wherein the axis of rotation of the at least one rotating first conveying device is offset horizontally from the axis of rotation of the at least one rotating second conveying device by from 85° to 90°.

* * * * *